(12) United States Patent
Crabill et al.

(10) Patent No.: US 6,975,087 B1
(45) Date of Patent: Dec. 13, 2005

(54) CLOSED-LOOP CONTROL SYSTEM

(75) Inventors: Monty L. Crabill, New Carlisle, OH (US); Robert J. Disser, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/912,998

(22) Filed: Aug. 6, 2004

(51) Int. Cl.$^7$ ............................................. G05B 11/18
(52) U.S. Cl. ....................... 318/590; 318/596; 318/599; 318/609
(58) Field of Search ................................ 318/590, 596, 318/599, 609, 610, 611, 621, 632, 672

(56) References Cited

U.S. PATENT DOCUMENTS

| | | | | |
|---|---|---|---|---|
| 4,912,753 A | * | 3/1990 | Evans, Jr. .................... | 700/245 |
| 5,293,316 A | * | 3/1994 | Slicker ......................... | 701/68 |
| 5,586,032 A | * | 12/1996 | Kallenbach et al. .......... | 701/45 |
| 5,710,506 A | * | 1/1998 | Broell et al. ................. | 320/145 |
| 6,735,030 B2 | * | 5/2004 | Ngo et al. .................... | 360/46 |

OTHER PUBLICATIONS

G.F. Franklin et al:"Feedback Control of Dynamic Systems", Third Edition, Addison-Wesley Publishing, 1994. Section 4.2.2 describes a PI Feedback Control for a better transient response.*

* cited by examiner

Primary Examiner—Bentsu Ro
(74) Attorney, Agent, or Firm—Michael D. Smith

(57) ABSTRACT

A control system for operating a device. The control system comprises a plurality of command elements generating command signals and a control element having a plurality of control modes. Each control mode includes a transfer function output effective to operate the device in a predetermined manner and is selectable in accordance with the status of at least one of the command signals. The transfer function output of a nonselected control mode is made to substantially track the transfer function output of a selected control mode such that the transfer function output of the nonselected control mode is substantially similar in magnitude to the transfer function output of the selected mode when the control element selects the nonselected mode. A method employs the system.

34 Claims, 6 Drawing Sheets

CLOSED-LOOP CONTROL SYSTEM

FIELD

The present invention relates generally to closed-loop control systems and, more particularly, to closed-loop motor control systems.

BACKGROUND

Control systems frequently utilize a closed-loop architecture to make adjustments to one or more operating parameters of a plant or device (e.g., an electric motor) being controlled by the system. These adjustments are based on feedback from a sensor or transducer coupled to the plant. An electrical signal generated by the sensor may represent position, voltage, velocity, torque, temperature, or any other appropriate parameter of the plant.

Several closed-loop control methodologies are well-known in the art. These methodologies include on-off control, proportional control, integral control, derivative control, and combinations of methodologies such as proportional-integral ("PI") control and proportional-integral-derivative ("PID") control.

With regard to control of electric motors, the speed of a motor may be adjusted by varying the voltage across one or more of its windings. Voltage is often supplied to a motor "open loop," i.e., without a closed-loop velocity feedback control. The motor voltage may vary in direct proportion to a voltage command signal from a closed-loop control system that is controlling a higher-level system parameter, such as position and velocity of an output element of the plant.

The torque delivered by a motor may be adjusted by varying the amount of current flowing through the motor's windings. A closed-loop current control ("CLCC") is often used for control of the motor's shaft torque, and also for protection of the motor's windings and any associated power devices used to drive the motor. Protection means may be required to limit motor current under certain conditions, such as start-up, direction reversals and overload. The output of a CLCC is a function of an error term representing the difference of the commanded current and the actual current. The CLCC attempts to reduce the error term to zero about the commanded current value by decreasing or increasing a drive signal coupled to the power devices to achieve a corresponding decrease or increase in motor current.

A motor control system may use more than one control mode to achieve the desired operating characteristics for a particular system. For example, a control system may utilize both an open-loop voltage control mode and a closed-loop current control mode. The output signal of either the voltage mode or the current mode, whichever has the smallest value, is selected to control a pulse width modulator ("PWM") that is used to systematically turn on and off power devices that connect a power source to the motor's windings.

The CLCC output of the current control mode responds to the error term according to a predetermined transfer function. However, when the system is operating in voltage control mode, the CLCC transfer function output does not control the PWM and thus cannot reduce its error term to zero by increasing or decreasing the motor current. Error-dependent terms for the CLCC thus accumulate, effectively increasing the CLCC transfer function's output to a large value while in voltage mode. If the voltage command signal is increased sufficiently (such as due to a large velocity error term or change in setpoint) so that a control element of the motor control invokes the current mode in accordance with predetermined criteria, the CLCC function exhibits significant overshoot due to a large output current value corresponding to the accumulated error term. Similarly, if a current command value of a closed loop control system is decreased for current limiting in accordance with predetermined criteria, the system may be forced to delay switching from voltage mode to current mode until the CLCC transfer function's output decays from the accumulated error-dependent terms to a value that is safe for the power devices and/or motor.

There is a need to control overshoot of a controlled parameter in a closed loop system when switching between control modes. There is a further need for a way to reduce the response time for a closed loop system when switching between control modes.

SUMMARY

The present invention provides a system and method for controlling overshoot and reducing the response time of a closed loop control system when switching between control modes. A plant, such as a motor, is controlled by an electrical drive means. First and second controlled parameters of the plant are measured and the measurement data is supplied to error signal generators. A first error signal generator compares a first control parameter measurement with a first control command signal that represents a setpoint for the parameter. The first error signal generator generates a first error signal representing the difference between the commanded and actual values for the first parameter. Likewise, a second error signal generator compares the second measured control parameter with a second control command and generates a second error signal. A first control algorithm receives the first error signal and generates a first control signal corresponding to predetermined criteria for the plant. Likewise, a second control algorithm receives second error signal and generates a second control signal. A control mode selection element compares the first and second control signals as well as an input signal from an open loop command and, based on predetermined criteria for the plant, selects one of the first and second control algorithms or input signal from an open-loop command. The control mode selection element generates a drive signal corresponding to the selected control signal, the drive signal acting to operate the drive means to supply power to the plant such that the plant performs in accordance with predetermined criteria.

In particular, the present invention improves the closed loop current control response of a motor controller when operation is switched from a voltage-control mode to a current-control mode. While operating in voltage mode, the CLCC transfer function's output has no effect on the actual current. To prevent the CLCC transfer function from increasing to a large value when attempting to reduce its error term to zero, the control signal of the CLCC is forced to substantially track the voltage mode control signal. This is accomplished by regularly, periodically or continuously setting the CLCC transfer function's value equal to the voltage control output, plus a predetermined offset value. Previous error-dependent terms are forced to zero values.

An embodiment of the present invention is a control system for operating a device. The system comprises a plurality of command elements generating command signals and a control element having a plurality of control modes, each control mode including a transfer function effective with a corresponding command signal as an input to operate the device in a predetermined manner and being selectable in accordance with the status of at least one of the command signals. The transfer function output of a nonselected control mode is made to substantially track the transfer function output of a selected control mode such that the transfer function output of the nonselected control mode is substantially similar in magnitude to the transfer function output of the selected mode when the control element selects the nonselected mode.

Another embodiment of the present invention is a control system for operating a device. The control system comprises a first command element generating a first command signal, a second command element generating a second command signal, and a control element having at least two control modes, each control mode including a transfer function output effective to operate the device in a predetermined manner and being selectable in accordance with the status of at least one of the first command signal and second command signal. The transfer function output of a nonselected control mode is made to substantially track the transfer function output of a selected control mode such that the transfer function output of the nonselected control mode is similar in magnitude to the transfer function output of the selected mode when the control element selects the nonselected mode.

Yet another embodiment of the present invention is a method for operating a device. The method comprises the steps of generating a first command signal, generating a second command signal, selecting from a plurality of control modes in accordance with the status of at least one of the first and second command signals, each control mode including a transfer function output effective to operate the device in a predetermined manner, and adjusting the transfer function output of a nonselected control mode to substantially track the transfer function output of a selected control mode such that the transfer function output of the nonselected control mode is similar in magnitude to the transfer function output of the selected mode when the nonselected mode is selected.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
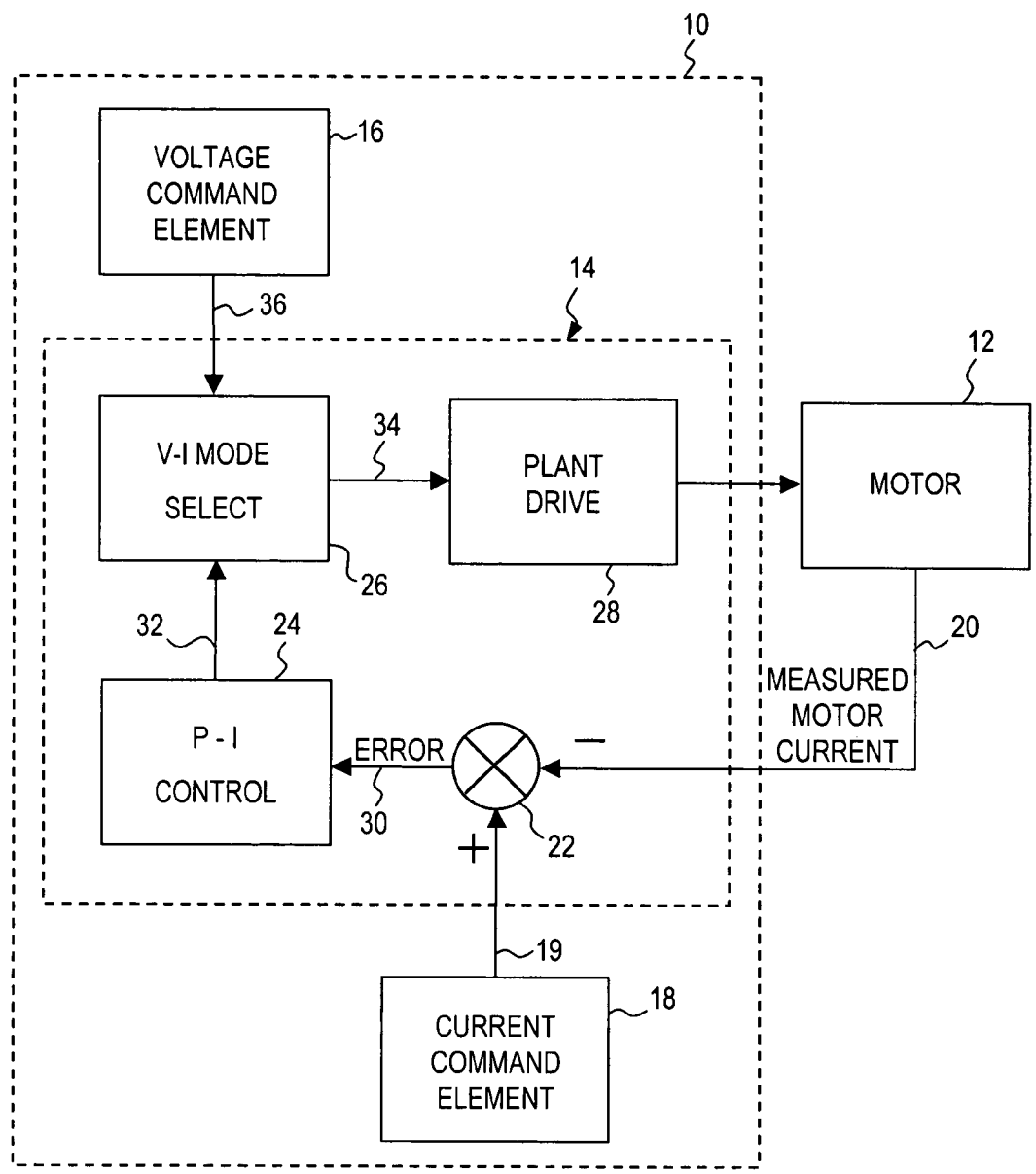
FIG. 1 is a block diagram of a motor control system according to an embodiment of the present invention.

A closed-loop control system 10 for controlling operation of a plant 12 such as an electric motor is depicted in FIG. 1 according to an embodiment of the present invention. Operation of control system 10 is first described with reference to prior control systems in order to better understand the present invention. Motor 12 is driven by a closed-loop control element 14. A voltage command element 16 provides control element 14 with a voltage command signal 36 that is related in a predetermined manner to a desired motor velocity, while a current command element 18 provides the control element with a current command signal 19 that is related in a predetermined manner to a desired motor torque or desired maximum current limit. The voltage and current command signals 36, 19 respectively, may each be provided to control element 14 in the form of any type of electrical signal, such as an analog or digital signal corresponding to the status or condition of the associated command element. A feedback loop 20 provides control element 14 with information regarding the amount of current flowing in the motor.

Voltage command element 16 represents a voltage setpoint for motor 12 while current command element 18 represents a current setpoint for the motor. Voltage command element 16 and current command element 18 generate signals 36, 19 respectively, corresponding to the setpoints. Voltage command element 16 and current command element 18 setpoints may be provided by any conventional means including, without limitation, manual controls and automatic controls.

Control element 14 includes a current error signal generator 22, a proportional-integral control element 24, voltage-current mode selection element 26, and a pulse-width modulator ("PWM") and driver 28, termed "plant drive" or "device drive" herein for convenience.

Error signal generator 22 receives a current command signal 19 corresponding to the desired motor current established by current command element 18 and compares the current command signal with a feedback signal 20 representing the current flowing through motor 12. Current command signal 19 and current feedback signal 20 may have any conventional format, such as analog and digital electrical signals having a predetermined range of values, or a carrier and modulation scheme. An error signal 30 generated by error signal generator 22 represents the magnitude of the difference between the commanded current 18 and measured current 20. The term "magnitude" is understood to include both magnitude and sign. Error signal 30 may likewise have any conventional analog, digital or carrier and modulation-scheme format.

Proportional-integral control element 24 receives error signal 30 and generates a correction signal 32 in accordance with predetermined criteria including, but not limited to, an algorithm, a transfer function, and a set of instructions such as a computer program. Correction signal 32 includes a portion that is proportional to the magnitude of error signal 30. Thus, if the difference between the measured motor current 20 and its commanded value 18 is large, P-I control element 24 may generate a relatively large correction signal 32. Conversely, if the error 30 is small, a small correction signal 32 is generated. This relationship is expressed generally by Equation 1:

$$\text{Proportional Portion of Correction Signal} = P^*(\text{commanded current} - \text{measured current}) \quad \text{Equation 1}$$

where P is a predetermined constant representing a desired proportional gain for system 10 and motor 12.

An integral-control portion of proportional-integral control element 24 functions to minimize current overshoot of motor 12 that would otherwise be present for a given setpoint of current command element 18. The integral control portion will respond in proportion to a mathematical integral of current error signal 30 over time, and will adjust for the constant offset of the proportional control portion of P-I control element 24 and adjust correction signal 32 if the current flowing through motor 12 differs from the value of current command signal 19 for a predetermined period of time. This relationship is expressed generally by Equation 2:

$$\text{Integral Portion of Correction Signal} = I * \frac{\sum(C-M)}{t}$$

Equation 2 where I is a predetermined integral gain factor representing a desired gain for system 10 and motor 12, C is commanded current 18, M is the measured current 20, and t is an integration time period.

In a preferred embodiment of P-I control element 24, the transfer function of the control is as shown in Equation 3:

$$U_s = \left(K_P + \frac{K_I}{s}\right) * E_s$$

Equation 3 where s is a Laplace variable, $U_s$ is the output of P-I ("PI") control element 24, $E_s$ is error signal 30, $K_P$ is a predetermined proportional control term, $$\frac{K_I}{s}$$

is a predetermined $$\frac{1}{s}$$

integral control term and is integration in continuous time.

Equation 3 may be rewritten to express the frequency response in terms of poles (denominator roots) and zeros (numerator roots). The rewritten equation is shown as Equation 4:

$$U_s = K_P * \omega_{PI} * \frac{\left(\frac{s}{\omega_{PI}} + 1\right)}{s} * E_s$$

Equation 4

$$\omega_{PI} = \frac{K_I}{K_P} (\text{rads}/\text{sec})$$

where

Equation 4 contains a pole (−6 dB/octave) at a frequency equal to 0, and a zero (+6 dB/octave) located at $\omega_{PI}$. The Bode plot of frequency response has a resultant −6 dB/octave slope for frequencies less than $\omega_{PI}$ and a 0 dB/octave slope for frequencies greater than $\omega_{PI}$.

Transforming Equation 4 from a continuous time "s" to a discrete time "z"

$$\left(\frac{1}{s}\right).$$

requires a discrete summation approximation for the integral term A zero-order hold ("ZOH") approximation that sums rectangular areas of samples having a width TsAmPLE and a height $E_k$ is described by Equation 5:

$$\Sigma_{k+1} = \Sigma_k + \Sigma_k * T_{SAMPLE}$$

Equation 5 where $\Sigma_k$ is the summation of previous rectangular areas of samples up to sample k, and $T_{SAMPLE}$= (k+1)−k. Expressed in the discrete time domain, $z*\Sigma_z = \Sigma_z + \Sigma z * T_{SAMPLE}$. Thus, $Ez*(z-1) = Ez*T_{SAMPLE}$. Equation 5 may be restated as shown in Equation 6:

$$\Sigma_z = E_z * \frac{T_{SAMPLE}}{z-1}$$

Equation 6

Substituting $$\frac{T_{SAMPLE}}{z-1}$$

for $$\frac{1}{s}$$

in Equation 3 yields Equation 7:

$$U_z = K_P * \left(1 + \omega_{PI} * \frac{T_{SAMPLE}}{z-1}\right) * E_z$$

Equation 7

Simplifying Equation 7 results in Equation 8:

$$U_z = \frac{K_P * z + K_P * (\omega_{PI} * T_{SAMPLE} - 1)}{z-1} * E_z$$

Equation 8

From Equation 8 the difference equation results, as shown in Equation 9:

$$U_{k+1} = K_P * E_{k+1} + K_P(\omega_{PI} * T_{SAMPLE} - 1) * E_k + U_k$$

Equation 9 where $K_P * E_{k+1}$ is the proportional term and $K_P(\omega_{PI} * T_{SAMPLE} - 1) * E_k + U_k$ is the integral term. Equation 9 may be expressed as shown in Equation 10:

$$U_{k+1} = A_1 * E_{k+i} + A_0 * E_k + U_k$$

Equation 10 where $A_1 * E_{k+1}$ is the proportional term, $A_0 * E_k + U_k$ is the integral term, $A_0 = K_P (\omega_{PI} * T_{SAMPLE} - 1)$, $A_1 = K_P$, $T_{SAMPLE}$ = discrete sample time, k = previous sample time, and k+1 = present sample time.

With continued reference to FIG. 1, voltage-current control mode selection element 26 receives correction signal 32 and selects between predetermined voltage control and current control criteria, such as transfer functions, algorithms and a set of predetermined instructions such as a computer program. Mode selection element 26 may be adapted to select either a voltage control mode or a current control mode, based on predetermined control criteria such as desired motor 12 operating characteristics for system 10. For example, system 10 may require that motor 12 accelerate to a predetermined velocity within a specified period of time, then deliver a specified amount of torque. System 10 may also periodically switch between voltage and current modes during operation, in response to changing motor 12 load conditions or changes to the voltage and current command signals 36, 19 respectively. Voltage-current mode selection element 26 generates an output signal 34 corresponding to the selected control mode, the output signal being in an electrical format compatible with plant drive 28 and representing predetermined characteristics of the selected voltage or current control mode.

Plant drive 28 translates V-I Mode selection element 26 output signal 34 into controlled electrical power and supplies the controlled power to motor 12 in accordance with any conventional pulse width modulation scheme. An output portion of plant drive 28 may include solid state switches that are switched on and off with a varying duty cycle in accordance with the PWM to provide a variable average voltage or current to motor 12. The average voltage or current supplied to motor 12 is increased by increasing the duty cycle of the switches; conversely, the average voltage or current is decreased by reducing the duty cycle of the switches. Plant drive 28 may also selectively turn on and off one or more predetermined portions of the solid state switches in a predetermined order to provide conventional commutation of motor 12. The solid state switches may be of any conventional type including, without limitation, field effect transistors ("FETs"), silicon controlled rectifiers ("SCRs"), insulated gate bipolar transistors ("IGBTs"), bipolar transistors and TRIACs.

Plant drive 28 is not limited to pulse width modulation and may take any form compatible with the element to be controlled. For example, a conventional linear voltage or current drive or a phase-controlled drive may be used to control electrical power supplied to a plant. Similarly, a plant drive 28 may be a conventional fluid drive used to control predetermined elements of a hydraulic or fluid plant including, without limitation, flow and pressure. Other electrical, mechanical, optical and fluid control elements of a closed-loop system may be envisioned by one skilled in the art without departing from the scope of the invention.

Control element 14 may be embodied in any conventional form including, without limitation, discrete and/or integrated digital and/or analog electronic circuitry. Control element 14 may further include a computing device such as a microprocessor, computer, microcomputer or a microcontroller. Control element 14 may further include any conventional electronic data storage device such as a read-only memory, a "flash" memory and a random access memory. A set of predetermined instructions for carrying out operation of control system 10, such as a computer program, may be stored in at least a portion of the electronic data storage device.

Motor 12 may be any type of conventional AC or DC motor including, without limitation, shunt-wound DC, series-wound DC, AC synchronous, brushless, stepper, linear, induction, split phase and permanent magnet motors.

System 10 and motor 12 may be sub-system components of a larger system. A larger system may include a plurality of cooperating sub-systems, each sub-system adapted to accomplish at least a portion of a predetermined task or action. Each sub-system of the larger system includes at least one feedback signal related to the feedback signals of other sub-systems in a predetermined manner. An example larger system is a servo control system wherein system 10 and motor 12 are utilized in conjunction with feedback devices (not shown) and predetermined instructions, such as a computer program, to electromechanically move a device such as a robotic arm in accordance with the instructions while controlling the velocity, force and position of the arm. In such embodiments, voltage command element 16 and current command element 18 may be set or adjusted by portions of the larger system.

Using equations 3-10 above, the following steps may be taken to improve the closed-loop current control response of the system of FIG. 1 as compared to the response of prior control systems. If at a sample time k+1, $V_{k+1}$ equals the voltage control output value, then if:

$$V_{k+1} < U_{k+1} = A_1 * E_{k+1} + A_0 * E_k + U_k$$

Then the control mode of V-I mode select element 26 is in voltage control mode with the following conditions:
$U_{k+1}$ and $U_k$ are set equal to $V_{k+1} + \Delta$; and
$E_{k+1}$ and $E_k$ are set equal to 0 where $\Delta$ = a predetermined offset value. The offset value is included as hysteresis for switching between selected and unselected control elements. However, if the following conditions are present at a sample time k+2:

$$V_{k+2} > U_{k+2} = A_1 * E_{k+2} + A_0 * E_{k+1} + U_{k+1}$$

the control mode of V-I mode select element 26 is in current control mode where:

$$U_{k+2} = A_1 * E_{k+2} + A_0 * 0 + V_{k+1} + \Delta$$

In operation, while system 10 is operating such that V-I mode selection element 26 is in a voltage control mode, the closed loop current control ("CLCC") transfer function output of the V-I mode selection element does not control the current through motor 12. To prevent the value of the closed loop current control transfer function output of P-I control element 24 from increasing to a large value in an attempt to reduce the error 30 to zero, V-I mode select element 26 forces the CLCC transfer function output of P-I control element 24 to substantially track the value of the voltage control transfer function output, plus a predetermined A hysteresis value appropriate for control system 10 and motor 12. Previously collected error-dependent terms are forced to zero values to eliminate their influence on proportional and integral transfer function outputs of P-I control element 24. As a result, the closed loop current control response of system 10 is improved when switching from voltage mode to current mode because the magnitude of the transfer function output of the current control portion of P-I control element 24 is close to the magnitude of the voltage mode transfer function output at the time of switchover.

EXAMPLE

Figure 2:
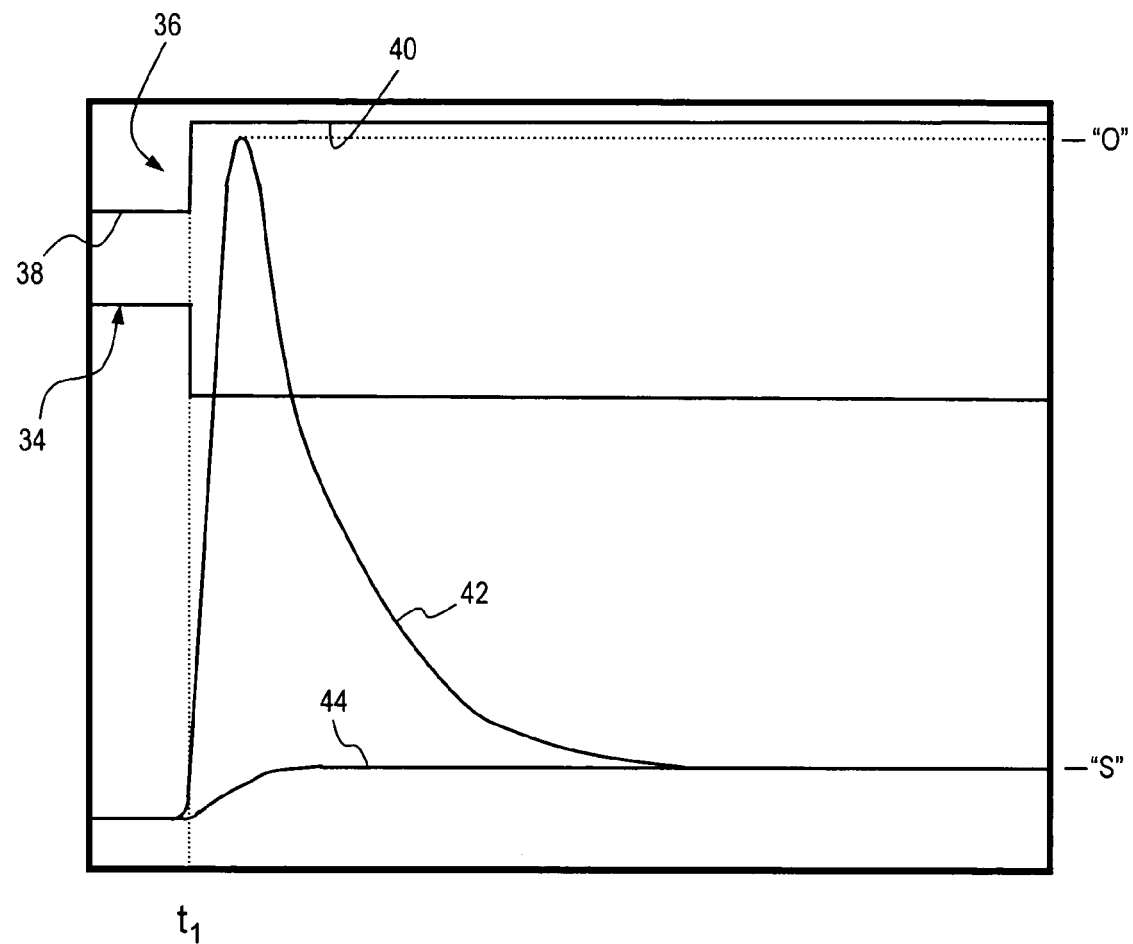
FIG. 2 is a diagram of oscilloscope patterns showing current control of the system of FIG. 1.
Figure 3:
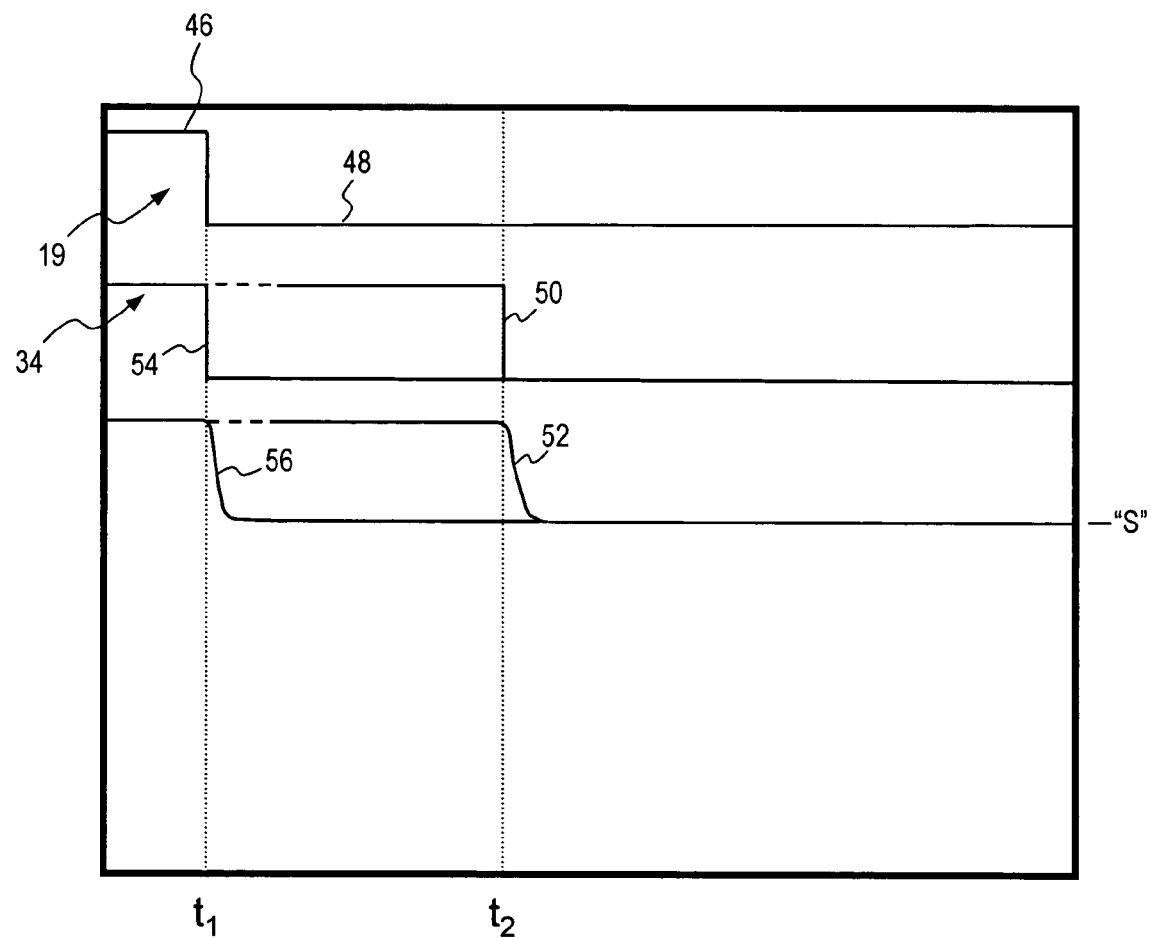
FIG. 3 is a diagram of oscilloscope patterns showing the mode-switching response time of the system of FIG. 1 in response to a large error signal.
Figure 4:
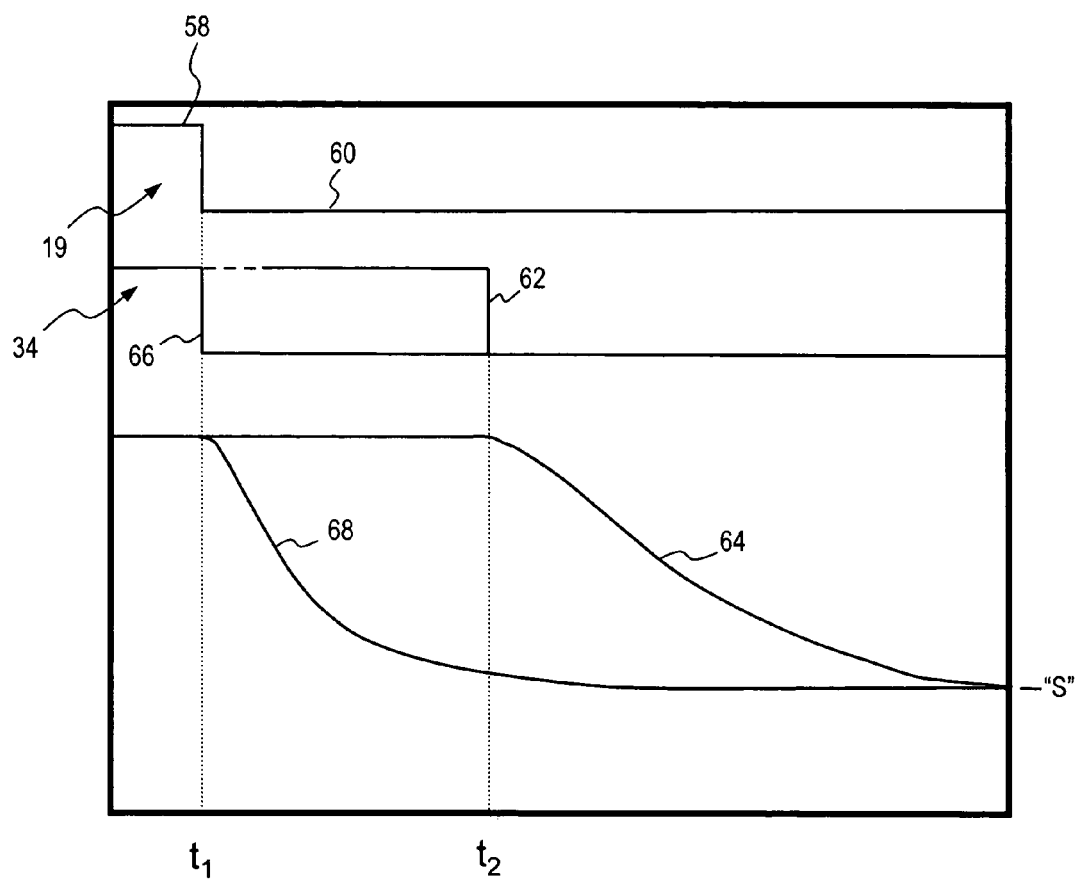
FIG. 4 is a diagram of oscilloscope patterns showing the mode-switching response time of the system of FIG. 1 in response to a small error signal.

An illustrative example of the action of control system 10 of FIG. 1 is shown in FIGS. 2–4 in accordance with an embodiment of the present invention. Referring first to FIG. 2 in conjunction with FIG. 1, oscilloscope patterns showing a plurality of voltage and current waveforms are depicted. When control system 10 is operated in accordance with prior art systems, a voltage command 16 signal 36 is changed at a time $t_1$ from a first commanded voltage 38 to a second, higher voltage 40. A voltage-current mode select element 26 signal 34 also changes logical states at $t_1$, representing a change from voltage mode to current mode in response to the change in status or condition of voltage command signal 36. Prior control systems wherein the proportional control portion of control element 24 goes into saturation, causing the integral portion of the transfer function output of P-I control element 24 to grow to a large value, a condition known in the art as "windup" will occur. If the change in voltage command signal 36 is large, the transfer function output of V-I mode select element 26 will cause plant drive 28 to operate with little or no current limiting. As a result, current flowing through motor 12 will overshoot to a large value "O" before settling to a desired setpoint "S", as illustrated by output current trace 42 of FIG. 2. Large overshoot currents are undesirable, as such currents may damage plant drive 28 and/or motor 12. In addition, overshoot currents can disrupt operation of control system 10, causing intermittent or unstable operations during mode changes.

Operation of the control system 10 of FIG. 1 will now be described when operated according to an embodiment of the present invention. It is desirable to achieve a smooth transition of the current delivered to motor 12 by plant drive 28 when changing control modes of control element 14 in order to minimize overshoot current. Referring to FIG. 2, when voltage command signal 36 is changed at time $t_1$ from a first commanded voltage 38 to a second, higher voltage 40, voltage-current mode select signal 34 changes its logical state at $t_1$, indicating a change from voltage mode to current mode in response to the change in status or condition of voltage command signal 34. Prior to time $t_1$, the CLCC transfer function output of V-I mode selection element 26 is forced to substantially track the transfer function output of the voltage control transfer function output of the V-I mode selection element. Thus, an output current signal 44 of plant drive 28 rises smoothly and directly to new setpoint "S" with little or no windup and thus little or no current overshoot.

Referring now to FIG. 3 in conjunction with FIG. 1, an example of improved control loop response time is illustrated for a control system in accordance with an embodiment of the present invention. FIG. 3 shows oscilloscope patterns depicting a plurality of voltage and current waveforms. At time $t_1$ a current command signal 19 changes from a first command status or condition 46 to a significantly lower value 48, introducing a large error into system 10. In response to the change in commanded current 18, a voltage-current selection signal 34 preferably changes logical states, indicating a change from voltage mode to current mode. However, a proportional-integral control of prior control systems 10 cannot immediately change states of selection signal 34 at $t_1$ due to integral windup. Consequently, selection signal 34 must change states at a later time $t_2$, as indicated by 50, after the integral windup has been dissipated in any conventional manner by control element 14, that is by the transfer function acting on the large error signal. Thus, there is a control system response delay time $\Delta t$, equal to $t_2 - t_1$. At $t_2$ selection signal 34 changes states, and an output current signal 52 accordingly reduces to a lower setpoint "S" at time $t_2$.

With reference again to FIGS. 1 and 3, a control system 10 will now be described when operated according to an embodiment of the present invention to reduce control system response time when changing from a selected control mode to an nonselected control mode. At time $t_1$ current command signal 19 changes from a first command value 46 to a significantly lower command value 48, introducing a large error into system 10. In response to the change in commanded current 18, voltage-current selection signal 34 changes logical states, indicating a change from voltage mode to current mode at 54. Prior to $t_1$ the transfer function output of the current mode portion of P-I control element 24 is forced to follow the voltage transfer function output, so there is little or no integral windup and mode change 54 can occur at or near at time $t_1$. Accordingly, output current 56 of plant drive 28 reduces to the new setpoint "S" at or near time $t_1$ with little or no integral windup-induced switching delay, resulting in improved response time when switching from voltage mode to current mode with a large error as compared to output current 52.

Referring now to FIG. 4 in conjunction with FIG. 1, another example of improved control loop response time according to an embodiment of the present invention is illustrated for motor control system 10 in accordance with an embodiment of the present invention. FIG. 4 shows oscilloscope patterns depicting a plurality of voltage and current waveforms. At time $t_1$ a current command signal 19 changes from a first command value 58 to a slightly lower command value 60, introducing a small error into system 10. In response to the change in commanded current 18, voltage-current selection signal 34 changes logical states, indicating a change from voltage mode to current mode. As before, a prior proportional-integral control, selection signal 34 cannot change states at $t_1$ due to integral windup. Consequently, selection signal 34 changes states at a later time $t_2$, as indicated by 62, after the integral windup has been dissipated by control element 14. Thus, there is a control system response delay time $\Delta t$, equal to $t_2 - t_1$. At $t_2$ selection signal 34 changes states, and an output current signal 64 of plant drive 28 accordingly reduces to a lower setpoint "S" beginning at time $t_2$ with little or no windup-induced switching delay.

With reference again to FIGS. 1 and 4, a control system 10 will now be described when operated according to an embodiment of the present invention to reduce control system response time when changing from a selected control mode to an nonselected control mode. At time $t_1$ current command signal 19 changes from a first command value 58 to a slightly lower command value 60, introducing a small error into system 10. In response to the change in commanded current 18, voltage-current selection signal 34 changes logical states, indicating a change from voltage mode to current mode at 66. Prior to $t_1$ the transfer function output of the current mode portion of V-I mode select element 26 is forced to follow the voltage transfer function output of the V-I mode select element, so there is no integral windup and mode change 66 can occur at or near $t_1$. Accordingly, an output current 68 of plant drive 28 begins reducing to the new setpoint "S" at or near time $t_1$, resulting in improved response time in switching from voltage mode to current mode with a small error, as compared to current 64.

Although the present invention has been described with reference to the control of a motor, the present invention may also be used to advantage with any closed-loop control system having a plurality of control modes. For example, the present invention may be adapted to receive conventional feedback signals including, without limitation, position, velocity, direction, flow, pressure and torque feedback signals relating to a parameter to be controlled by control system 10. In such systems an improved time response from the closed loop transfer function output may be achieved for conditions where a commanded control value for a first function is changed while a second control function is actively controlling the system. The transfer function output of the first control mode is forced to substantially track the transfer function output of the second control mode with the result that the switchover to the first control mode in response to the change in commanded control value occurs with improved time response.

Figure 5:
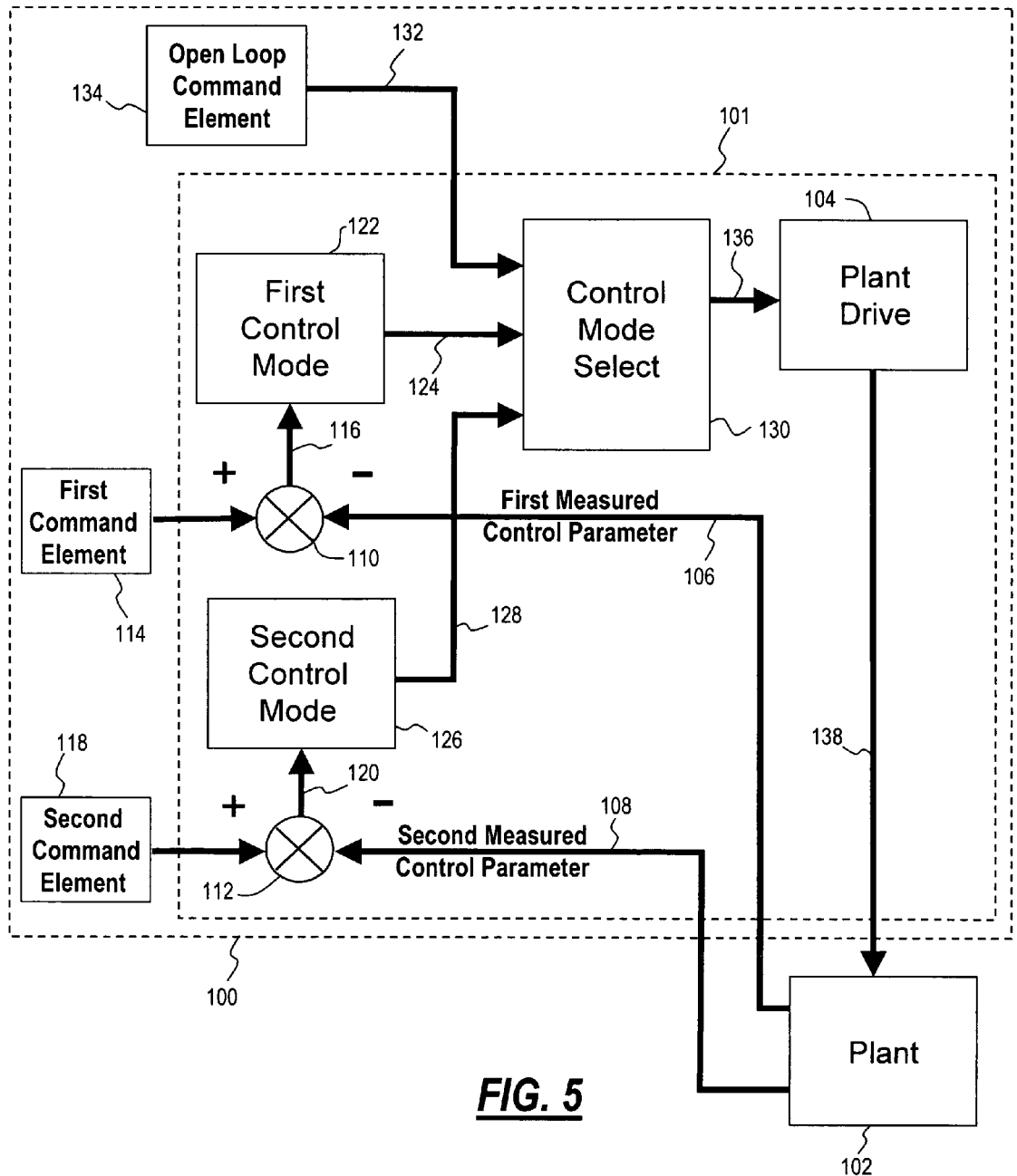
FIG. 5 is a block diagram of a closed-loop control system according to another embodiment of the present invention.

An example closed loop control system 100 having more than two control modes is shown in FIG. 5. Control system 100 includes a control element 101. A plant 102 refers generically to any device or variable to be controlled by system 100. Plant 102 is controlled by any conventional output control 104 plant drive means, such as relays and solid state switches, as previously described above for control system 10.

First and second parameters 106, 108 respectively of plant 102 are measured and supplied to first and second error signal generators 110, 112 respectively. The parameters may be any electrical signal corresponding to a variable of plant 102 to be controlled including, without limitation, velocity, light, position, voltage, current, torque, pressure, flow, direction, temperature and sound. First error signal generator 110 compares first measured control parameter 106 with a first control command 114 and generates a first error signal 116. Likewise, second error signal generator 112 compares second measured control parameter 108 with a second control command 118 and generates a second error signal 120.

A first control mode component 122 receives first error signal 116 and, in accordance with a predetermined set of criteria and instructions, such as a computer program or an algorithm, generates a first control mode signal 124. Likewise, a second control mode component 126 receives second error signal 120 and generates a second control mode signal 128 in accordance with a predetermined set of criteria and instructions, such as a computer program or an algorithm. A third command 134, such as an open-loop control, generates a third control mode signal 132. Control mode signals 124, 128 and 132 may have any conventional format, such as analog and digital electrical signals having a predetermined range of values, or a carrier and modulation scheme.

A control mode selection element 130 receives first and second control mode signals 124, 128 respectively as well as a third control mode signal 132 from third control command element 134. Control mode selection element 130 compares signals 124, 128, 132 and, in accordance with a predetermined set of criteria and instructions, such as a computer program, selects one of first and second control modes or the open loop command element output signal 122, 126 and 132, respectively.

Selection element 130 generates a drive signal 136 appropriate for the selected control mode, the drive signal corresponding to the selected control mode of the first and second control modes or the open loop command element output signal and being in a format compatible with plant drive 104. Plant drive 104 is adapted to vary at least one aspect of plant 102. In one example wherein plant 102 is a motor, plant drive 104 may vary the voltage and/or current supplied to the motor to achieve a desired velocity and torque delivered by an output shaft of the motor.

Control commands 114, 118 and 134 are setpoints for control parameters of plant 102. Control commands 114, 118 and 134 may establish the setpoints in any conventional manner. In one embodiment of the present invention, control commands 114, 118 and 134 are manual controls set by a user of plant 102. In other embodiments control system 100 may be a component of a larger system wherein control commands 114, 118 and 134 may be setpoints established by other elements of the larger system to vary plant 102 in a predetermined manner to achieve control of the larger system. An example of such a larger system is a computer numerically controlled ("CNC") machine wherein a plurality of servomotors, tools and feedback signals are used to automatically position and machine a workpiece in a predetermined manner to produce a completed part having predetermined characteristics and features.

Figure 6:
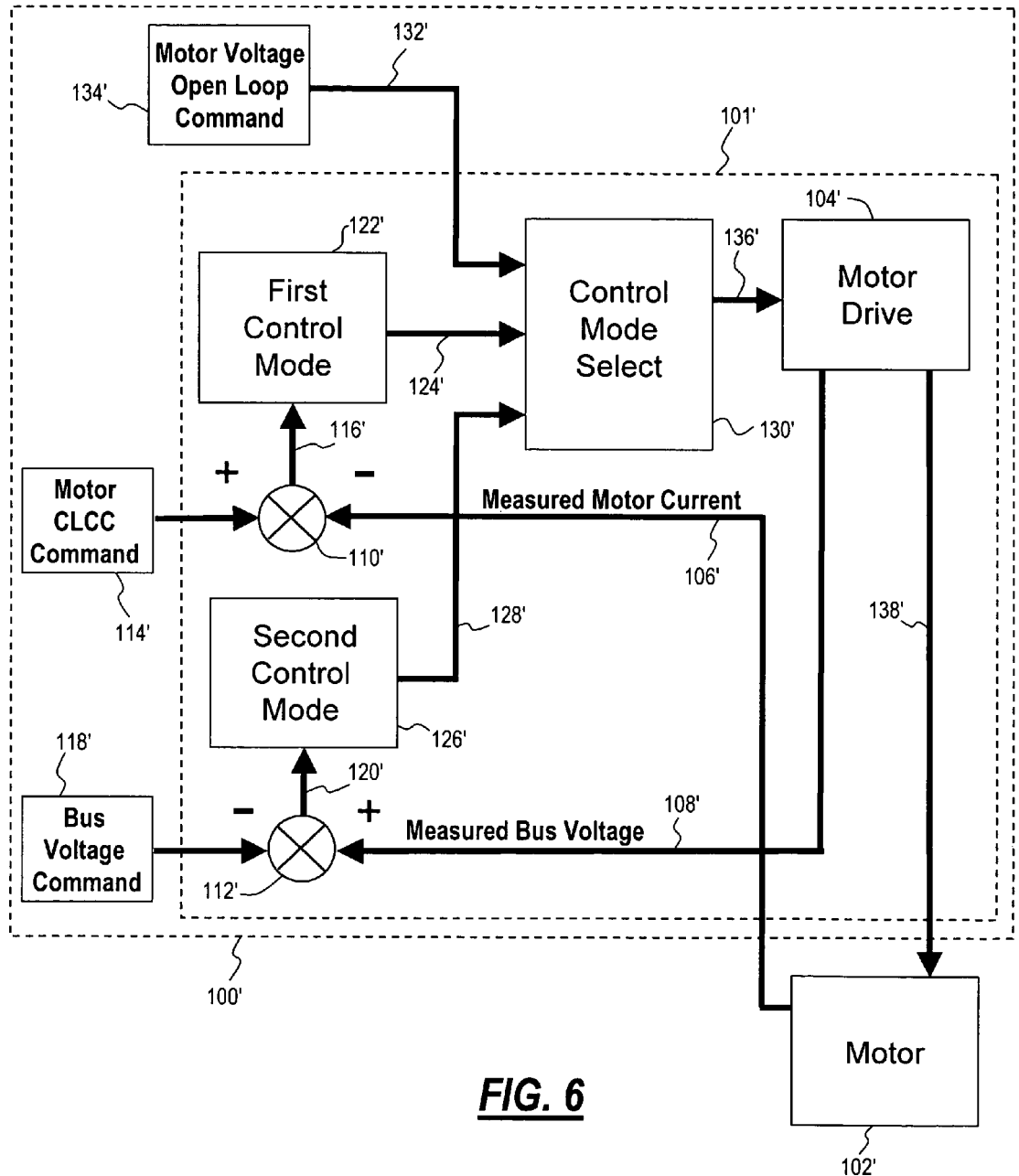
FIG. 6 is a block diagram of a closed-loop control system according to another embodiment of the present invention

An example embodiment of the system of FIG. 5 is shown in FIG. 6. In system 100', a closed-loop current command 114' establishes a predetermined setpoint for closed-loop current control of a motor 102'. A power supply bus voltage command 1118' establishes a predetermined setpoint for regulation of a power supply bus voltage portion of a motor drive 104'. An open-loop motor voltage command 134' establishes a setpoint for the velocity of motor 102'. A feedback loop 108' is coupled between motor drive 104' and an error signal generator 112' to monitor bus voltage. If the setpoints of commands 114', 134' cause motor 102' to draw current in excess of the capacity of the power supply of motor drive 104', a droop in the bus voltage is detected by error signal generator 112', which compares the bus voltage setpoint established by bus voltage command 118' with the measured bus voltage 108'. Second control mode 126' generates a control mode signal 128', providing compensation in the manner previously described to cause mode selection element 130' to regulate the bus voltage at the level established by bus voltage command 118'. All other elements of FIG. 6 function in the same manner as previously described for FIG. 5.

It should be noted that the present invention has been described herein with reference to an electric motor for purposes of example. However, the invention may be used to advantage with any closed-loop control system to control the characteristics of any physical parameter of a plant in a predetermined manner including, without limitation, electrical, mechanical, fluid, acoustical, optical and pneumatic characteristics. For example, a hydraulic motor may be controlled by the invention wherein a first command signal is a hydraulic motor flow command signal, a second command signal is a hydraulic motor pressure command signal, and a third command signal is a hydraulic fluid accumulator pressure command signal.

While this invention has been shown and described with respect to detailed embodiments thereof, it will be understood by those skilled in the art that various changes in form and detail thereof may be made without departing from the scope of the claims of the invention. For example, with reference again to FIG. 5, control system 100 may be adapted to monitor any number of control parameters associated with system 100, plant 102 or a larger system by adding feedback signals, error signal generators, command elements, and control mode components in the manner discussed above. Control mode selection element 130 may likewise be adapted to receive the plurality of control signals from the control mode components and vary plant drive 104 (which in some embodiments may be a plurality of plant drives) in accordance with a predetermined set of instructions to control the operation of a plurality of parameters of system 100, plant 102 and/or a larger system.

What is claimed is:

1. A control system for operating a device, comprising:
    a plurality of command elements generating command signals; and
    a control element having a plurality of control modes, each control mode including a transfer function effective with a corresponding command signal as an input to operate the device in a predetermined manner and being selectable in accordance with the status of at least one of the command signals, wherein the transfer function output of a nonselected control mode is made to substantially track the transfer function output of a selected control mode such that the transfer function output of the nonselected control mode is substantially similar in magnitude to the transfer function output of the selected mode when the control element selects the nonselected mode.

2. The control system of claim 1 wherein the control element further comprises:
    a proportional-integral control element; and
    an error signal generator adapted to:
        measure the difference between a feedback signal from the device and at least one of the command signals, and
        generate an error signal that is coupled to the proportional-integral element,
    wherein the proportional-integral control element receives the error signal and generates a correction signal in accordance with predetermined criteria.

3. The control system of claim 2 wherein the feedback signal is one of a position, velocity, direction, flow, pressure and torque feedback signal.

4. The control system of claim 1 wherein the control system is one of a plurality of control systems cooperating in a larger system.

5. The control system of claim 1 wherein the control element further comprises a control mode selection element adapted to select a control mode in accordance with predetermined criteria.

6. The control system of claim 5 wherein the control element includes a computing device and the predetermined criteria is a set of instructions.

7. The control system of claim 1 wherein the control modes include at least one of a voltage control mode and a current control mode.

8. The control system of claim 1 wherein the control element further includes a device drive.

9. The control system of claim 8 wherein the device drive is one of a pulse width modulated drive, a linear drive, a phase-controlled drive, and a fluid drive.

10. The control system of claim 1 wherein the device is an electric motor, a first command signal is a motor voltage command signal, and a second command signal is a current command signal.

11. The control system of claim 10, further comprising a third command element generating a bus voltage command signal.

12. The control system of claim 1 wherein the device is a hydraulic motor, a first command signal is a hydraulic motor flow command signal, and a second command signal is a hydraulic motor pressure command signal.

13. The control system of claim 12, further comprising a third command element generating a hydraulic fluid accumulator pressure command signal.

14. The control system of claim 1 wherein the control system is effective to reduce integral windup when changing from a selected control mode to a nonselected control mode.

15. The control system of claim 14 wherein the control element limits overshoot of a controlled parameter when changing from a selected control mode to a nonselected control mode.

16. The control system of claim 14 wherein the control element changes from a selected control mode to a nonselected control mode while limiting integral windup-induced switching delay of a drive portion of the control element.

17. A control system for operating a device, comprising:
    a first command element generating a first command signal;
    a second command element generating a second command signal; and
    a control element having at least two control modes, each control mode including a transfer function output effective to operate the device in a predetermined manner and being selectable in accordance with the status of at least one of the first command signal and second command signal, wherein the transfer function output of a nonselected control mode is made to substantially track the transfer function output of a selected control mode such that the transfer function output of the nonselected control mode is similar in magnitude to the transfer function output of the selected mode when the control element selects the nonselected mode.

18. The control system of claim 17 wherein the control element further comprises:
    a proportional-integral control element; and
    an error signal generator adapted to:
        measure the difference between a feedback signal from the device and at least one of the first and second command signals, and
        generate an error signal that is coupled to the proportional-integral element,
    wherein the proportional-integral control element receives the error signal and generates a correction signal in accordance with predetermined criteria.

19. The control system of claim 18 wherein the feedback signal is one of a position, velocity, direction, flow, pressure and torque feedback signal.

20. The control system of claim 17 wherein the control system is one of a plurality of control systems cooperating in a larger system.

21. The control system of claim 17 wherein the control element further comprises a control mode selection element adapted to select a control mode in accordance with predetermined criteria.

22. The control system of claim 21 wherein the control element includes a computing device and the predetermined criteria is a set of instructions.

23. The control system of claim 17 wherein the control modes include at least one of a voltage control mode and a current control mode.

24. The control system of claim 17 wherein the control element further includes a device drive.

25. The control system of claim 24 wherein the device drive is one of a pulse width modulated drive, a linear drive, a phase-controlled drive and a fluid drive.

26. The control system of claim 17 wherein the device is an electric motor, the first command signal is a motor voltage command signal, and the second command signal is a motor current command signal.

27. The control system of claim 26, further comprising a third command element generating a bus voltage command signal.

28. The control system of claim 17 wherein the device is a hydraulic motor, the first command signal is a hydraulic motor flow command signal, and the second command signal is a hydraulic motor pressure command signal.

29. The control system of claim 28, further comprising a third command element generating a hydraulic fluid pressure accumulator signal.

30. The control system of claim 17 wherein the control element limits integral windup when changing from a selected control mode to a nonselected control mode.

31. The control system of claim 30 wherein the control element limits overshoot of a controlled parameter when changing from a selected control mode to a nonselected control mode.

32. The control system of claim 30 wherein the control element changes from a selected control mode to a nonselected control mode while limiting integral windup-induced switching delay of a drive portion of the control element.

33. A method for operating a device, comprising the steps of:

generating a first command signal;

generating a second command signal;

selecting from a plurality of control modes in accordance with the status of at least one of the first and second command signals, each control mode including a transfer function output effective to operate the device in a predetermined manner; and adjusting the transfer function output of a nonselected control mode to substantially track the transfer function output of a selected control mode such that the transfer function output of the nonselected control mode is similar in magnitude to the transfer function output of the selected mode when the nonselected mode is selected.

34. A method for operating a device, comprising the steps of:

generating a plurality of command signals;

selecting from a plurality of control modes, each control mode including a transfer function output effective to operate the device in a predetermined manner and being selectable in accordance with the status of at least one of the command signals, each control mode including a transfer function output effective to operate the device in a predetermined manner; and adjusting the transfer function output of a nonselected control mode to substantially track the transfer function output of a selected control mode such that the transfer function output of the nonselected control mode is similar in magnitude to the transfer function output of the selected mode when the nonselected mode is selected.

* * * * *